US012154752B2

(12) United States Patent
Ishii et al.

(10) Patent No.: US 12,154,752 B2
(45) **Date of Patent: *Nov. 26, 2024**

(54) X-RAY MODULE

(71) Applicant: HAMAMATSU PHOTONICS K.K., Hamamatsu (JP)

(72) Inventors: Atsushi Ishii, Hamamatsu (JP); Ginji Sugiura, Hamamatsu (JP); Akihito Kobayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,223

(22) Filed: Apr. 27, 2023

(65) Prior Publication Data

US 2023/0290604 A1 Sep. 14, 2023

Related U.S. Application Data

(63) Continuation of application No. 17/569,686, filed on Jan. 6, 2022.

(30) Foreign Application Priority Data

Jan. 22, 2021 (JP) ................................ 2021-009020
Jan. 22, 2021 (JP) ................................ 2021-009025

(51) Int. Cl.
*H01J 35/14* (2006.01)
*H05G 1/02* (2006.01)

(52) U.S. Cl.
CPC ........... *H01J 35/153* (2019.05); *H05G 1/025* (2013.01); *H01J 2235/1216* (2013.01); *H01J 2235/1245* (2013.01); *H01J 2235/1291* (2013.01)

(58) Field of Classification Search
CPC ....... H01J 2235/1216; H01J 2235/1291; H01J 35/153; H01J 2235/1245; H05G 1/025
See application file for complete search history.

(56) References Cited

U.S. PATENT DOCUMENTS 6,213,639 B1 4/2001 Hell et al.
11,721,515 B2 * 8/2023 Ishii ...................... H01J 35/153 378/137

(Continued)

FOREIGN PATENT DOCUMENTS

JP S61-183861 A 8/1986
JP H03-022331 A 1/1991

(Continued)

OTHER PUBLICATIONS

JP 2010-170718 A with English translation (Year: 2010).*

(Continued)

*Primary Examiner* — Chih-Cheng Kao
(74) *Attorney, Agent, or Firm* — Faegre Drinker Biddle & Reath LLP

(57) ABSTRACT

An X-ray module includes; a housing; an electron gun that emits an electron beam inside the housing; a target disposed inside the housing and fixed to the housing, to generate an X-ray when the electron beam is incident on the target; a permanent magnet that is disposed outside the housing and deflects the electron beam by means of a magnetic force; and a heat radiating unit having a higher thermal conductivity than a thermal conductivity of the permanent magnet and thermally connected to the permanent magnet.

10 Claims, 9 Drawing Sheets

(56) References Cited

U.S. PATENT DOCUMENTS

| | | | |
|---|---|---|---|
| 2008/0080672 A1 | 4/2008 | Anno | |
| 2012/0177186 A1 | 7/2012 | Westcot et al. | |
| 2013/0208870 A1 | 8/2013 | Neuser et al. | |
| 2014/0161232 A1 | 6/2014 | Jeong et al. | |
| 2016/0172149 A1 | 6/2016 | Tezuka et al. | |
| 2017/0338077 A1 | 11/2017 | Tsujino et al. | |

FOREIGN PATENT DOCUMENTS

| | | | |
|---|---|---|---|
| JP | 2004-079304 | A | 3/2004 |
| JP | 2004-265602 | A | 9/2004 |
| JP | 2004-358211 | A | 12/2004 |
| JP | 2008-535183 | A | 8/2008 |
| JP | 2009-176654 | A | 8/2009 |
| JP | 2010-021011 | A | 1/2010 |
| JP | 2010-170718 | A | 8/2010 |
| JP | 2017-054679 | A | 3/2017 |
| JP | 2017-098076 | A | 6/2017 |
| JP | 2018-124217 | A | 8/2018 |
| JP | 6667366 | B2 | 3/2020 |
| JP | 2022-112963 | A | 8/2022 |
| JP | 2022-112967 | A | 8/2022 |
| WO | WO 2006/105332 | A2 | 10/2006 |

OTHER PUBLICATIONS

JP 2011-159931 A with English translation (Year: 2011).*
DE 19743163 A1 with English translation (Year: 1999).*
WO 2019/198342 A1 and English translation (Year: 2019).*
JP 2004-079304 A and English translation (Year: 2004).*
JP 2017-054679 A and English translation (Year: 2017).*

* cited by examiner

X-RAY MODULE

TECHNICAL FIELD

One aspect of the present disclosure relates to an X-ray module.

BACKGROUND

An X-ray module has been known which includes a cathode which irradiates an electron beam, a target which is irradiated by the electron beam and generates X-rays, and a magnet portion which moves the irradiation position of the electron beam that is irradiated on the target by means of a magnetic field of a permanent magnet (for example, refer to Japanese Unexamined Patent Publication No. 2004-265602). In the X-ray module described in Japanese Unexamined Patent Publication No. 2004-265602, when the target has deteriorated at a current irradiation position, the irradiation position can be moved to extend the lifespan of the target.

In the above-described X-ray module, since an efficiency of conversion of the electron beam into the X-ray in the target is approximately 1%, and approximately 99% of the incident electron beam becomes heat, a large amount of heat can be generated in the target. When the heat is transferred to the permanent magnet, there is concern that the permanent magnet is heated and the magnetic force decreases. In this case, the amount of deflection of the electron beam is changed, and the position of an X-ray focal point (irradiation point of the electron beam on the target) is changed. For example, when the position of the X-ray focal point is changed during continuous imaging by computed tomography (CT) or the like, there is concern that an acquired image is blurred.

SUMMARY

Therefore, an object of one aspect of the present disclosure is to provide an X-ray module capable of stably outputting an X-ray.

According to one aspect of the present disclosure, there is provided an X-ray module including: a housing; an electron gun that emits an electron beam inside the housing; a target disposed inside the housing and fixed to the housing, to generate an X-ray when the electron beam is incident on the target; and a deflection unit including a permanent magnet and disposed outside the housing, to deflect the electron beam by means of a magnetic force of the permanent magnet. The deflection unit includes a heat insulating member disposed at least between the permanent magnet and the housing. A thermal conductivity of the heat insulating member is lower than a thermal conductivity of the permanent magnet.

In the X-ray module, the deflection unit includes the heat insulating member disposed at least between the permanent magnet and the housing, and the thermal conductivity of the heat insulating member is lower than the thermal conductivity of the permanent magnet. Accordingly, even when heat generated in the target is transferred to the deflection unit, the transfer of the heat to the permanent magnet can be suppressed by the heat insulating member, and as a result, the heating of the permanent magnet by the heat generated in the target can be suppressed. Therefore, the X-ray module is capable of stably outputting the X-ray.

The thermal conductivity of the heat insulating member may be lower than a thermal conductivity of a portion of the housing, the portion being in contact with the deflection unit. In this case, even when heat generated in the target is transferred to the deflection unit via the housing, the transfer of the heat to the permanent magnet can be suppressed by the heat insulating member.

The heat insulating member may house the permanent magnet inside. In this case, the transfer of heat generated in the target to the permanent magnet can be effectively suppressed.

The heat insulating member may extend to partition between the permanent magnet and the housing. In this case, the transfer of heat generated in the target to the permanent magnet can be effectively suppressed.

The deflection unit may further include a holding member holding the permanent magnet, and a thermal conductivity of the holding member may be higher than the thermal conductivity of the permanent magnet. In this case, heat transferred to the deflection unit can be released to the holding member.

The heat insulating member may isolate the permanent magnet from the holding member. In this case, the transfer of heat from the holding member to the permanent magnet can be suppressed.

When viewed in a direction perpendicular to a path along which the electron beam emitted from the electron gun travels to the target, the deflection unit may include a portion overlapping the path. In this case, the electron beam can be satisfactorily deflected by the deflection unit.

The X-ray module according to one aspect of the present disclosure may further include a heat radiating unit having a higher thermal conductivity than the thermal conductivity of the permanent magnet and being thermally connected to the deflection unit. In this case, heat transferred to the deflection unit can be released to the heat radiating unit.

The heat radiating unit may include a plurality of fins. In this case, heat radiation by the heat radiating unit can be improved.

The heat radiating unit may be formed in a pipe shape. In this case, heat radiation by the heat radiating unit can be improved.

According to one aspect of the present disclosure, it is possible to provide the X-ray module capable of stably outputting the X-ray.

DETAILED DESCRIPTION

Hereinafter, one embodiment of the present disclosure will be described in detail with reference to the drawings. In the following description, the same reference signs are used for the same or corresponding elements, and duplicated descriptions will be omitted.

[X-Ray Generation Device]

Figure 1:
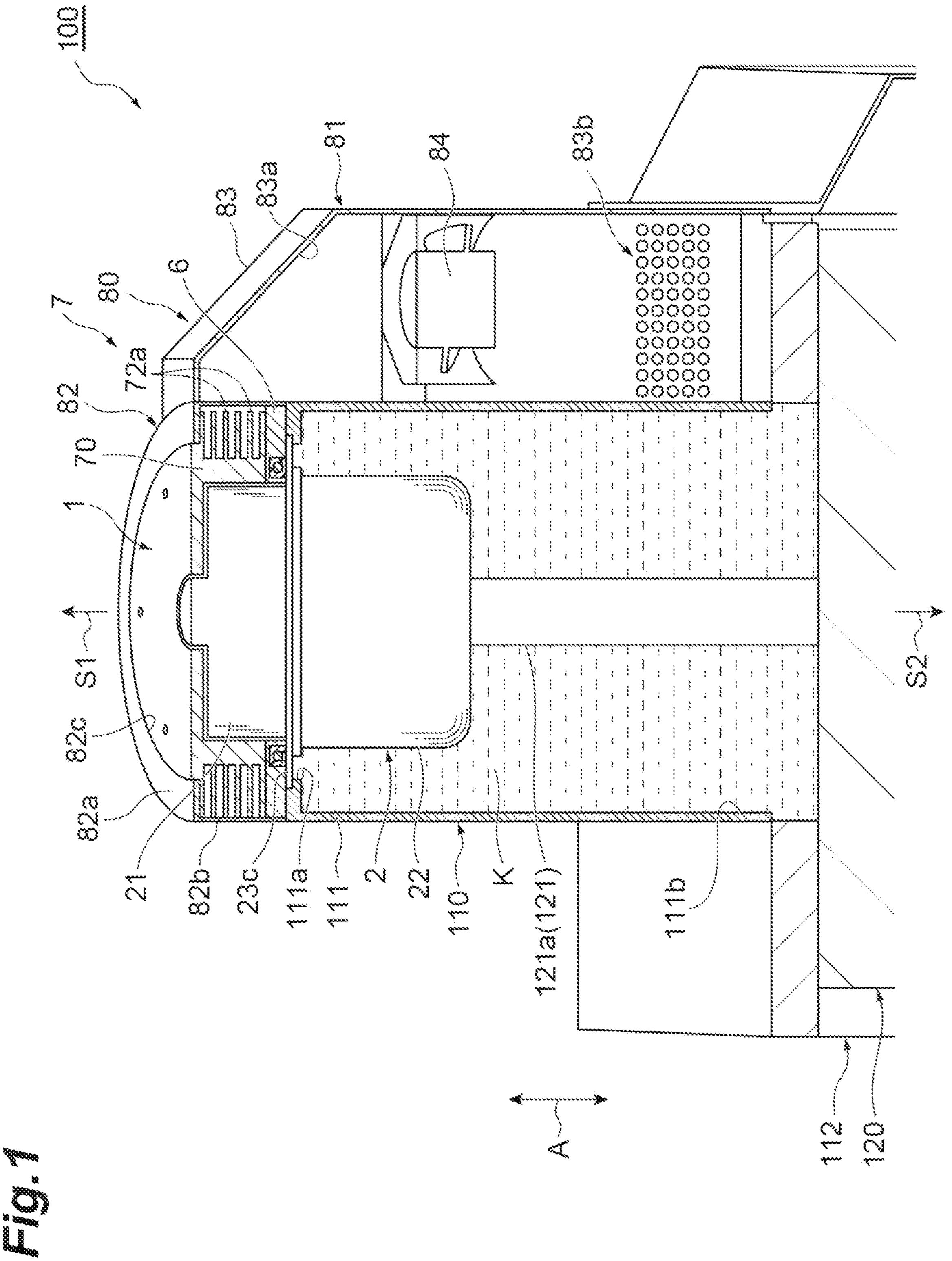
FIG. 1 is a cross-sectional view of an X-ray generation device according to an embodiment.

An X-ray generation device (X-ray module) 100 illustrated in FIG. 1 is, for example, a microfocus X-ray source used for an X-ray non-destructive inspection in which an internal structure of an inspection object is observed. The X-ray generation device 100 includes an X-ray tube 1, a heat radiating unit 7, a case 110, and a power source unit 120.

Figure 2:
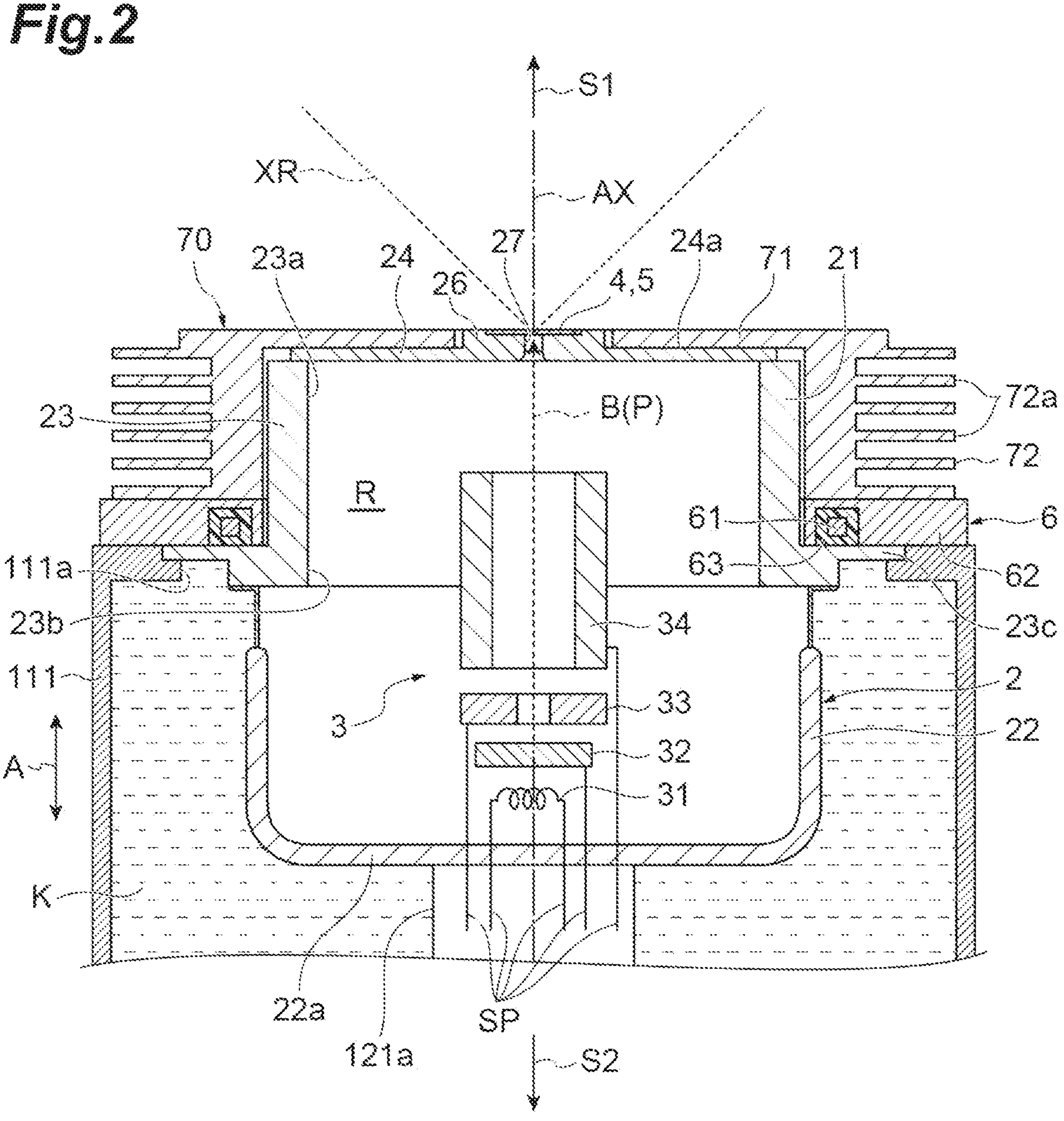
FIG. 2 is a cross-sectional view of an X-ray tube.
Figure 3:
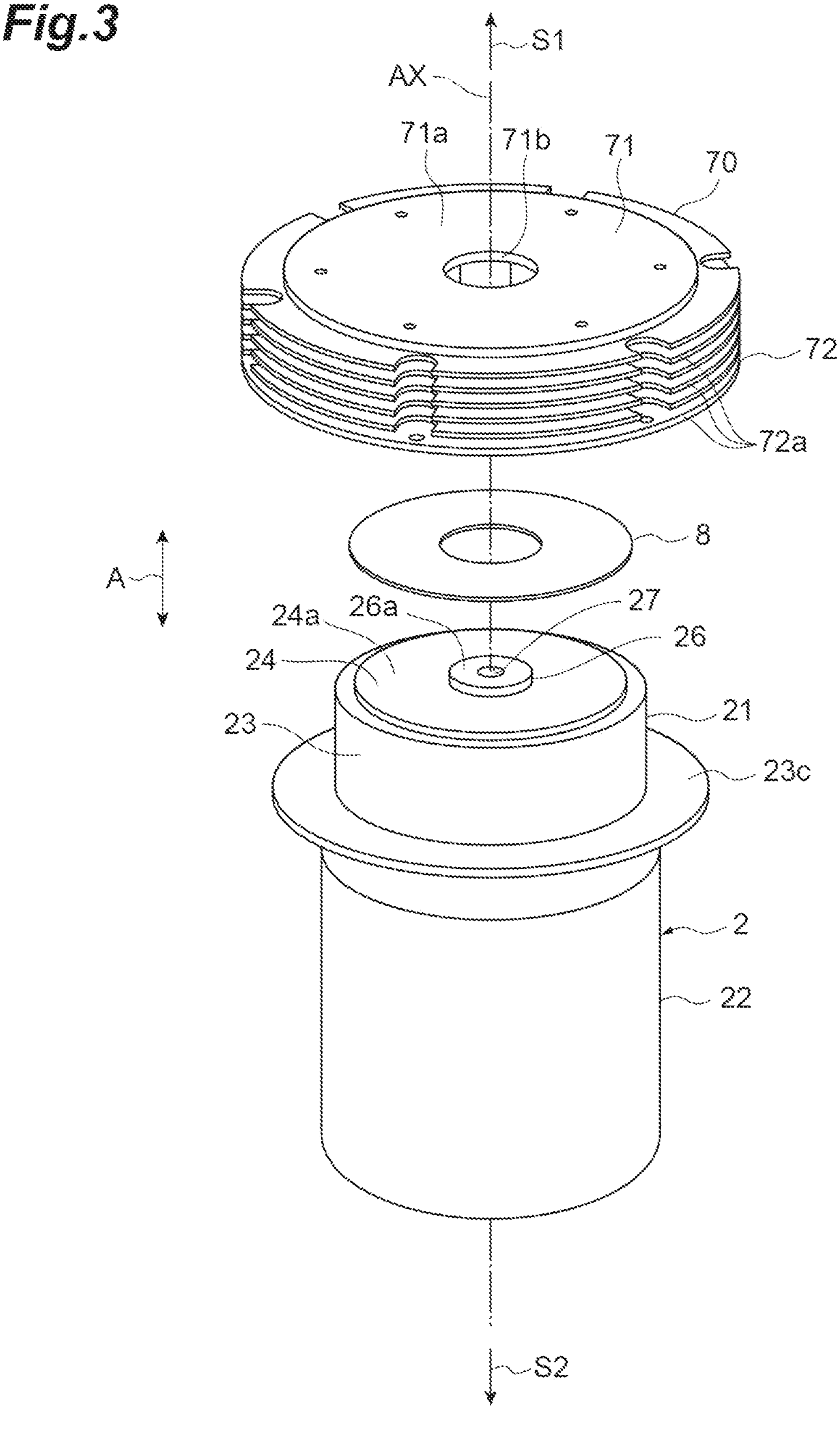
FIG. 3 is an exploded perspective view of the X-ray tube.

As illustrated in FIG. 2, the X-ray tube 1 is a transmission type X-ray tube that emits an X-ray XR from an X-ray-emitting window 5 in a direction along an incident direction of an electron beam B, the X-ray XR being generated when the electron beam B from an electron gun 3 is incident on a target 4 and transmitting through the target 4 itself. The X-ray tube 1 is a vacuum-sealed x-ray tube that includes a housing 2 having an internal space R in a vacuum state and does not require component replacement or the like. In the following description, it is assumed that a direction parallel to a tube axis AX of the X-ray tube 1 is an axial direction A, one side (upper side in the drawings) in the axial direction A is a first side S1, and the other side (side opposite the first side S1) in the axial direction A is a second side S2. In the X-ray tube 1, an optical axis of the electron beam B coincides with an optical axis the X-ray XR.

The housing 2 has a substantially columnar outer shape. The housing 2 includes a head portion 21 made of a metal material and an insulating valve 22 made of an insulating material such as glass. The target 4 and the X-ray-emitting window 5 are fixed to the head portion 21.

The electron gun 3 is fixed to the insulating valve 22. The electron gun 3 emits the electron beam B in the internal space R. For example, the electron gun 3 is configured such that a heater 31, a cathode 32, a first grid electrode 33, and a second grid electrode 34 are disposed side by side in order from the second side S2. The heater 31 is formed of a filament that is energized to generate heat. The cathode 32 is heated by the heater 31 to emit electrons. The first grid electrode 33 and the second grid electrode 34 are formed in a cylindrical shape. The first grid electrode 33 is provided to control the amount of electrons emitted from the cathode 32, and the second grid electrode 34 is provided to focus the electrons, which have passed through the first grid electrode 33, toward the target 4. The heater 31, the cathode 32, the first grid electrode 33, and the second grid electrode 34 are electrically connected to a plurality of stem pins SP provided to penetrate through a bottom portion 22*a* of the insulating valve 22.

The case 110 includes a cylindrical member 111 and a power source unit case 112. The case 110 is made of a metal material. The cylindrical member 111 is formed in a substantially cylindrical shape, and includes an opening 111*a* and an opening 111*b* at both ends in the axial direction A. The X-ray tube 1 is inserted into the opening 111*a* such that the head portion 21 protrudes from the opening 111*a*. An attachment flange 23*c* of the X-ray tube 1 is fixed to an end portion on the first side S1 of the cylindrical member 111. Accordingly, the X-ray tube 1 seals the opening 111*a*. An insulating oil K that is a liquid insulating substance is sealed in the cylindrical member 111.

The power source unit 120 supplies electric power to the X-ray tube 1. The power source unit 120 is housed in the power source unit case 112. The power source unit 120 seals the opening 111*b* of the cylindrical member 111. The power source unit 120 includes a high-voltage power supply portion 121 including a connector 121*a* having a cylindrical shape. The high-voltage power supply portion 121 is electrically connected to the X-ray tube 1. Specifically, a tip portion of the connector 121*a* is electrically connected to the stem pins SP protruding from the bottom portion 22*a* of the insulating valve 22. In this example, with the target 4 (anode) having a ground potential, and a negative high voltage (for example, −10 kV to −500 kV) is supplied from the power source unit 120 to the electron gun 3 via the high-voltage power supply portion 121.

[X-Ray Tube]

As illustrated in FIGS. 1 to 7, the X-ray tube 1 includes the housing 2, the electron gun 3, the target 4, the X-ray-emitting window 5, and a deflection unit 6. As described above, the housing 2 includes the head portion 21 and the insulating valve 22. The head portion 21 corresponds to an anode of the X-ray tube 1 in terms of electrical potential. The head portion 21 includes a body portion 23 and a lid portion 24. The body portion 23 is made of, for example, stainless steel (for example, SUS304), copper, an iron alloy, a copper alloy, or the like in a substantially cylindrical shape coaxial with the tube axis AX, and includes openings 23*a* and 23*b* at both ends in the axial direction A. The opening 23*a* is closed by the lid portion 24. The lid portion 24 is fixed to an edge portion of the opening 23*a*. The body portion 23 communicates with the insulating valve 22 through the opening 23*b*, the insulating valve 22 having a substantially cylindrical shape coaxial with the tube axis AX. An outer peripheral surface of the body portion 23 is provided with the attachment flange 23*c* that is formed in a substantially annular plate shape concentric with the body portion 23.

The lid portion 24 is made of, for example, molybdenum in a substantially circular plate shape coaxial with the tube axis AX, and closes the opening 23*a* of the body portion 23. A protrusion 26 protruding to the first side S1 with respect to a surface 24*a* of the lid portion 24 on the first side S1 is formed on the surface 24*a*. The surface 24*a* has a circular shape, and the protrusion 26 is formed in a columnar shape concentric with the lid portion 24. An opening portion 27 penetrating through the lid portion 24 along the axial direction A is formed in the protrusion 26.

Figure 4:
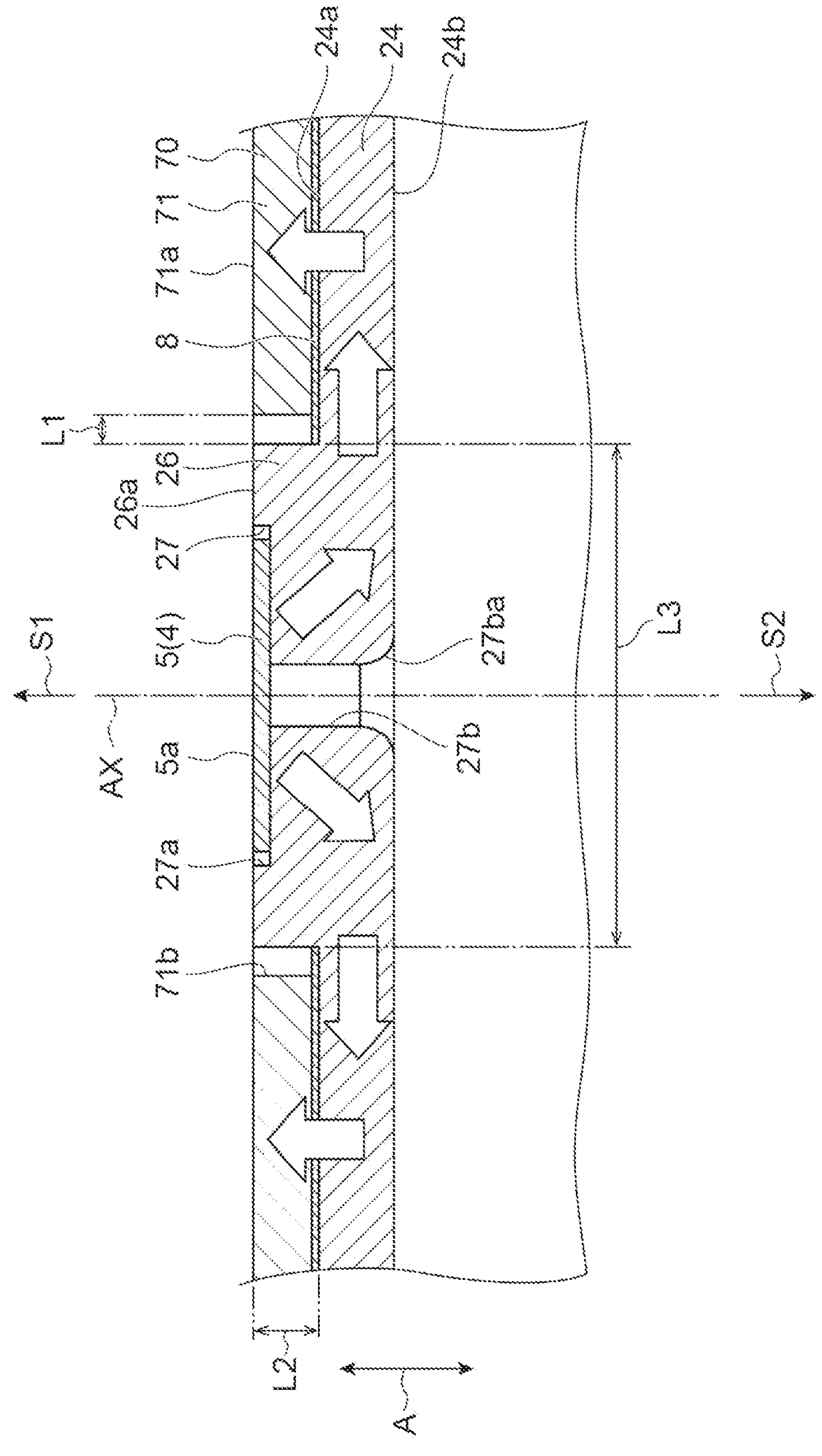
FIG. 4 is a cross-sectional view illustrating a periphery of a protrusion.
Figure 5:
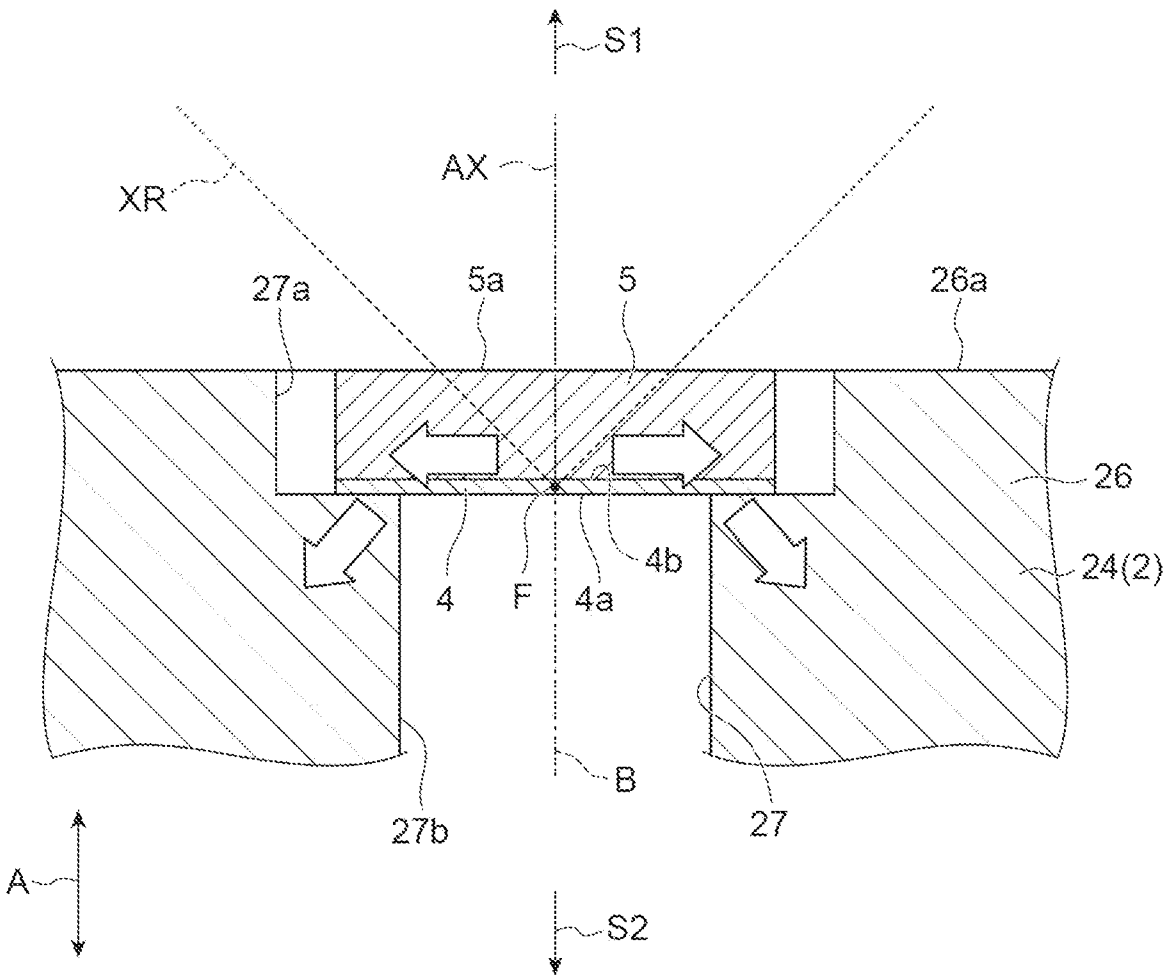
FIG. 5 is a cross-sectional view illustrating a periphery of a target.
Figure 6:
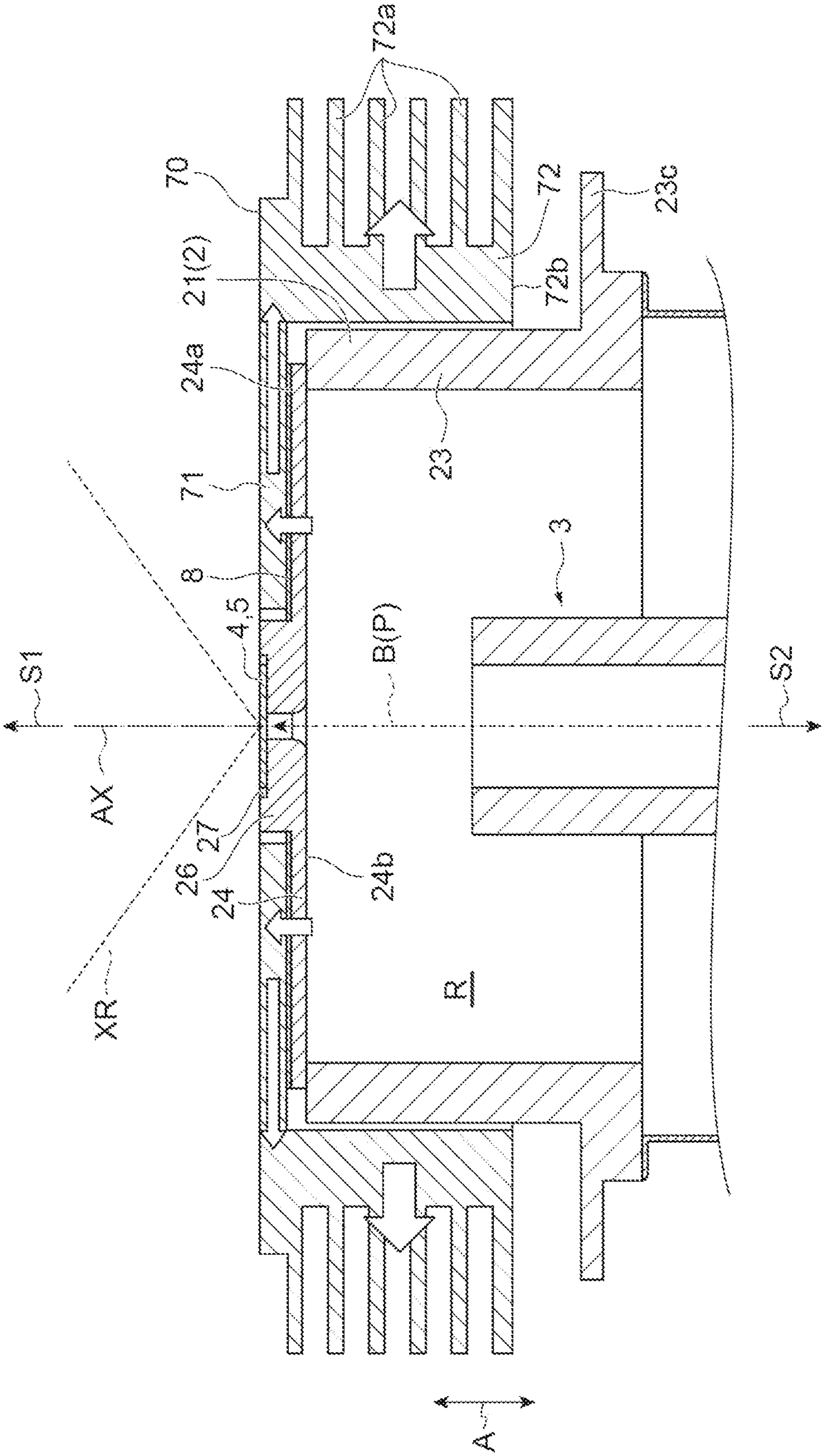
FIG. 6 is a cross-sectional view of the X-ray tube.

As illustrated in FIGS. 4 to 6, the opening portion 27 includes a first portion 27*a* that is open to a surface 26*a* of the protrusion 26 on the first side S1, and a second portion 27*b* that communicates with the first portion 27*a* and that is open to a surface 24*b* of the lid portion 24 on the second side S2. Each of the first portion 27*a* and the second portion 27*b* is formed in a circular shape in cross section which is concentric with the protrusion 26. A diameter of the first portion 27*a* is larger than a diameter of the second portion 27*b*, and a depth of the first portion 27*a* is shallower than a depth of the second portion 27*b*. In other words, the first portion 27*a* is a recess formed in the surface 26*a* of the protrusion 26, and the second portion 27*b* is a through-hole formed in a bottom surface of the first portion 27*a*. The first portion 27*a* functions as a disposition portion in which the target 4 and the X-ray-emitting window 5 are disposed. The second portion 27*b* functions as an electron beam passage hole through which the electron beam B to be incident on the target 4 passes. An end portion of the second portion 27*b* on the second side S2 is provided with a widening portion 27*ba* of which the diameter increases toward the second side S2, and is chamfered in a curved surface shape so as not to form a corner.

The target 4 and the X-ray-emitting window 5 are disposed in the first portion 27*a*. The target 4 is made of, for example, tungsten, and includes an electron-incident surface 4*a* and an X-ray-emitting surface 4*b* on a side opposite the electron-incident surface 4*a*. The target 4 transmits an X-ray generated when the electron beam B is incident on the electron-incident surface 4*a*, and emits the X-ray from the X-ray-emitting surface 4*b*. In this example, the target 4 is formed in a film shape on an entirety of a surface on the second side S2 of the X-ray-emitting window 5. Namely, the target 4 is integrally formed with the X-ray-emitting window 5. The target 4 is disposed such that the electron-incident surface 4*a* faces the second side S2 and the X-ray-emitting surface 4*b* faces the first side S1. A thickness of the target 4 is, for example, approximately several μm.

The X-ray-emitting window 5 is made of, for example, a highly radiolucent material such as diamond or beryllium in a circular plate shape. The X-ray-emitting window 5 is disposed coaxially with the tube axis AX on the bottom surface of the first portion 27*a* of the opening portion 27, is fixed to the bottom surface by a joining member such as a brazing material (not illustrated), and seals the opening portion 27. The X-ray-emitting window 5 is in thermal contact with the bottom surface of the first portion 27*a* via the target 4. In this example, a surface 5*a* of the X-ray-emitting window 5 on the first side S1 is located on substantially the same plane as the surface 26*a* of the protrusion 26 on the first side S1. The X-ray-emitting window 5 faces the electron gun 3 in the axial direction A, transmits the X-ray XR emitted from the target 4, and emits the X-ray XR to the first side S1 in the axial direction A. As illustrated in FIG. 5, the X-ray XR is generated at an X-ray focal point F that is an irradiation point of the electron beam B on the target 4, and is emitted while spreading around the X-ray focal point F. The target 4 may be provided in only a region exposed to the second portion 27*b* on the surface of the X-ray-emitting window 5, or a part of the target 4 may also be provided on a wall surface of the second portion 27*b*. In addition, the target 4 and the X-ray-emitting window 5 may be provided away from each other.

Figure 7:
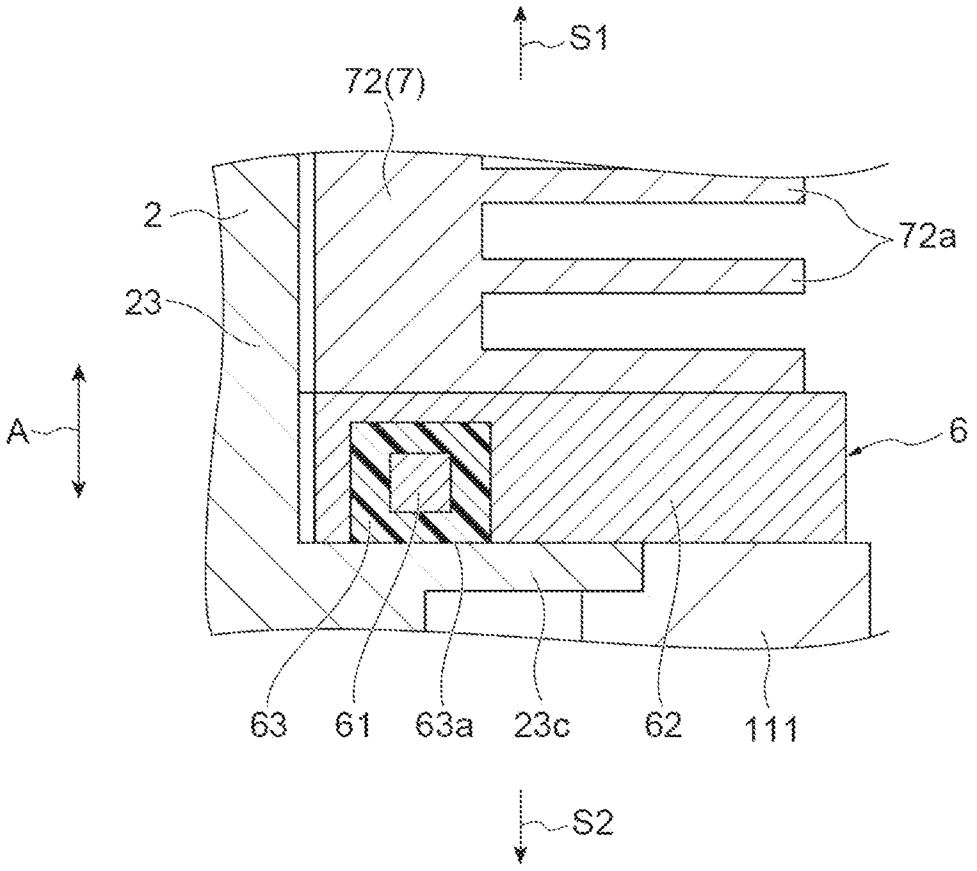
FIG. 7 is a cross-sectional view illustrating a periphery of a deflection unit.

As illustrated in FIGS. 2 and 7, the deflection unit 6 includes a plurality of permanent magnets 61, a holding member 62, and a heat insulating member 63. The deflection unit 6 includes a pair of the permanent magnets 61 facing each other in a radial direction. The pair of permanent magnets 61 are disposed such that different poles face each other in the radial direction. The permanent magnet 61 is formed of, for example, a ferrite magnet, a neodymium magnet, a samarium cobalt magnet, an alnico magnet, or the like.

The holding member 62 is made of, for example, a metal material such as aluminum in a flat cylindrical shape (annular shape) coaxial with the tube axis AX, and holds the permanent magnets 61. In addition, a thermal conductivity of the holding member 62 is higher than a thermal conductivity of the permanent magnet 61, and the holding member 62 can be utilized as a part of the heat radiating unit 7. The holding member 62 is disposed outside the housing 2, and is fixed to the attachment flange 23*c* in a state where the holding member 62 is in contact with a surface of the attachment flange 23*c* of the body portion 23 on the first side S1. The holding member 62 overlaps a part of the body portion 23 in the radial direction, and is disposed close to the body portion 23 to cover a part of the outer peripheral surface of the body portion 23. The holding member 62 is slightly separated from the body portion 23 in the radial direction, but may be in contact with the body portion 23. In addition, the holding member 62 may be formed of a plurality of members instead of being a cylindrical (annular) integrated member.

The heat insulating member 63 is made of, for example, a resin material such as silicone resin, epoxy resin, acrylic resin, polyimide resin, polyphenylene sulfide (PPS) resin, polyetheretherketone resin (PEEK). In order to suppress a decrease in the magnetic force of the permanent magnets 61 caused by a heat treatment when the heat insulating member 63 is cured, silicone resin, epoxy resin, and acrylic resin that is curable at room temperature are preferably used as the material of the heat insulating member 63.

The heat insulating member 63 houses the permanent magnet 61 inside. Namely, the permanent magnet 61 is disposed inside the heat insulating member 63 in a state where the permanent magnet 61 is surrounded by the heat insulating member 63. For example, the heat insulating member 63 is fixed to the holding member 62, and the holding member 62 holds the permanent magnet 61 via the heat insulating member 63. The heat insulating member 63 isolates the permanent magnet 61 from the holding member 62. A surface 63*a* of the heat insulating member 63 on the second side S2 is in contact with the surface of the attachment flange 23*c* of the body portion 23 on the first side S1. An outer surface other than the surface 63*a* in the heat insulating member 63 is covered with the holding member 62. Namely, the heat insulating member 63 is provided such that the heat insulating member 63 is embedded in the holding member 62 and only the surface 63*a* is exposed from the holding member 62. In such a manner, the heat insulating member 63 includes a portion disposed between the permanent magnet 61 and the attachment flange 23*c* of the body portion 23.

The deflection unit 6 deflects the electron beam B by means of the magnetic force of the permanent magnets 61 to change the position of the X-ray focal point F. When viewed in a direction (radial direction) perpendicular to a path P along which the electron beam B emitted from the electron gun 3 travels to the target 4, the deflection unit 6 includes a portion overlapping the path P. Accordingly, the magnetic force of the permanent magnets 61 can be suitably applied to the electron beam B. In this example, an entirety of the deflection unit 6 overlaps the path P when viewed in the radial direction. The deflection unit 6 is attached to the attachment flange 23*c* such that an imaginary line connecting the pair of permanent magnets 61 facing each other is substantially orthogonal to the tube axis AX. The deflection unit 6 may be rotatable around the tube axis AX. In this case, the position of the X-ray focal point F can be moved by rotating the deflection unit 6.

A thermal conductivity of the holding member 62 is higher than a thermal conductivity of the permanent magnet 61. A thermal conductivity of the heat insulating member 63 is lower than a thermal conductivity of the body portion 23 of the housing 2 (portion of the housing 2 in contact with the deflection unit 6). Namely, heat insulation of the heat insulating member 63 is higher than heat insulation of the body portion 23. In addition, the thermal conductivity of the heat insulating member 63 is lower than the thermal conductivity of each of the permanent magnet 61 and the holding member 62. When the body portion 23 is made of SUS304, the thermal conductivity of the body portion 23 is, for example, 16.7 W/m·K. The thermal conductivity of the permanent magnet 61 is, for example, approximately 1 to 50 W/m·K, the thermal conductivity of the holding member 62 is, for example, approximately 100 to 400 W/m·K, and the thermal conductivity of the heat insulating member 63 is, for example, approximately 0.1 to 0.5 W/m·K. The thermal conductivity can be measured by general measurement methods such as a heat flow meter method, a laser flash method, and a hot wire method.

As illustrated in FIGS. 1, 3, 4, and 6, the heat radiating unit 7 includes a heat sink 70 that radiates heat generated in the target 4, and a cooling unit 80 that cools the heat sink 70, and is disposed outside the housing 2. The heat sink 70 is made of, for example, a metal material such as aluminum. A thermal conductivity of the heat sink 70 is higher than the thermal conductivity of each of the body portion 23 and the permanent magnet 61. The thermal conductivity of the heat sink 70 is, for example, approximately 100 to 400 W/m·K. The heat sink 70 includes a first portion 71 and a second portion 72.

The first portion 71 is formed in a circular plate shape coaxial with the tube axis AX, and includes an opening 71*b* in a central portion thereof. The first portion 71 extends perpendicularly to the tube axis AX along the surface 24*a* of the lid portion 24, and the protrusion 26 is disposed in the opening 71*b*. The first portion 71 surrounds the protrusion 26 when viewed in the axial direction A. A surface of the first portion 71 on the second side S2 is in contact with the surface 24*a* of the lid portion 24 via a heat conducting member 8 having a sheet shape. Accordingly, the first portion 71 is thermally connected to the surface 24*a* of the lid portion 24. The heat conducting member 8 is, for example, a silicone sheet made of a silicone having a high thermal conductivity in a circular sheet shape, is disposed between an entirety of the surface 24*a* and the first portion 71, and is in close contact with the surface 24*a* and the first portion 71. Since the heat conducting member 8 intervenes between the first portion 71 and the lid portion 24, heat conduction between the first portion 71 and the lid portion 24 can be more promoted than when the first portion 71 and the lid portion 24 that are made of a metal material are in direct contact with each other.

As illustrated in FIG. 4, the first portion 71 is slightly separated from the protrusion 26 in the radial direction. A distance L1 between the first portion 71 and the protrusion 26 in the radial direction is smaller than a protrusion height L2 of the protrusion 26 from the surface 24*a* of the lid portion 24 in the axial direction A, and is smaller than a diameter L3 of the protrusion 26 (width of the protrusion 26 in the radial direction). The first portion 71 may be in contact with the protrusion 26. The first portion 71 does not protrude to the first side S1 with respect to the protrusion 26. In other words, when a surface 71*a* of the first portion 71 on the first side S1 and the surface 26*a* of the protrusion 26 on the first side S1 are flat, the surface 71*a* is located on the same plane as the surface 26*a* or is located closer to the second side S2 than the surface 26*a*. In this example, the surface 71*a* is located on the same plane as the surface 26*a*. In addition, the surface 71*a* is located on the same plane as the surface 5*a* of the X-ray-emitting window 5 on the first side S1.

The second portion 72 is formed in a substantially cylindrical shape concentric with the first portion 71, and extends from an outer edge of the first portion 71 to the second side S2. The second portion 72 is located outside an outer edge of the surface 24*a* of the lid portion 24 when viewed in the axial direction A, and is located closer to the second side S2 in the axial direction A than the surface 24*a*. In this example, an entirety of the second portion 72 is located closer to the second side S2 than the surface 24*a*, but only a part of the second portion 72 may be located closer to the second side S2 than the surface 24*a*. The second portion 72 overlaps a part of the body portion 23 in the radial direction, and covers a part of the outer peripheral surface of the body portion 23. The second portion 72 is slightly separated from the body portion 23 in the radial direction, but may be in contact with the body portion 23. A surface 72*b* of the second portion 72 on the second side S2 is in contact with a surface on the first side S1 of the holding member 62 of the deflection unit 6, and is thermally connected to the deflection unit 6.

A plurality of fins 72*a* are formed in an outer peripheral surface of the second portion 72. Each of the fins 72*a* is formed in a substantially circular plate shape concentric with the second portion 72. The plurality of fins 72*a* are disposed parallel to each other and side by side at equal intervals along the axial direction A. Air from a cooling fan 84 to be described later is supplied to the fins 72*a*.

The cooling unit 80 includes an air blowing unit 81 and a surrounding portion 82 formed in a substantially cylindrical shape to surround the heat sink 70. The air blowing unit 81 includes a hood portion 83 and the cooling fan 84. The hood portion 83 covers one side of the cylindrical member 111 in the direction perpendicular to the axial direction A, and forms a space 83*a*. The cooling fan 84 is disposed in the space 83*a*. A plurality of through-holes are formed as a ventilation portion 83*b* in the hood portion 83. The cooling fan 84 sends outside air to the surrounding portion 82 as cooling air, the outside air being suctioned from the ventilation portion 83*b*.

The surrounding portion 82 includes an upper wall portion 82*a* and a side wall portion 82*b*. The upper wall portion 82*a* is formed in an annular shape, and defines an opening 82*c* on the first side S1 of the surrounding portion 82. The surrounding portion 82 is disposed such that the surface 71*a* of the first portion 71 on the first side S1 is exposed from the opening 82*c*. The side wall portion 82*b* is formed in a cylindrical shape, and surrounds the plurality of fins 72*a*, together with the upper wall portion 82*a*. The surrounding portion 82 forms a flow path through which the cooling air sent from a communication portion between the air blowing unit 81 and the surrounding portion 82 circulates so as to flow through spaces between the plurality of fins 72*a* in a circumferential direction. Accordingly, a heat radiation efficiency of the heat sink 70 can be improved. Incidentally, the cooling air is exhausted from a ventilation portion (not illustrated) provided in the side wall portion 82*b*. Accordingly, it is possible to make it difficult for the exhausted cooling air to flow to an inspection object side, and an influence of exhausting during imaging can be suppressed. In addition, the cooling fan 84 may operate to suction outside air from the ventilation portion provided in the side wall portion 82*b* and to exhaust the outside air from the ventilation portion 83*b* provided in the hood portion 83.

Function and Effects

In the X-ray generation device 100, the deflection unit 6 includes the heat insulating member 63 disposed at least between the permanent magnet 61 and the housing 2, and the thermal conductivity of the heat insulating member 63 is lower than the thermal conductivity of the permanent magnet 61. Accordingly, even when heat generated in the target 4 is transferred to the deflection unit 6, the transfer of the heat to the permanent magnet 61 can be suppressed by the heat insulating member 63, and as a result, the heating of the permanent magnet 61 by the heat generated in the target 4 can be suppressed. Therefore, the X-ray generation device 100 is capable of stably outputting the X-ray.

The thermal conductivity of the heat insulating member 63 is lower than the thermal conductivity of the body portion 23 of the housing 2 (portion of the housing 2 which is in contact with the deflection unit 6). Accordingly, even when heat generated in the target 4 is transferred to the deflection unit 6 via the housing 2, the transfer of the heat to the permanent magnet 61 can be suppressed by the heat insulating member 63.

The heat insulating member 63 houses the permanent magnet 61 inside. Accordingly, the transfer of heat generated in the target 4 to the permanent magnet 61 can be effectively suppressed.

The deflection unit 6 includes the holding member 62 holding the permanent magnet 61, and the thermal conductivity of the holding member 62 is higher than the thermal conductivity of the permanent magnet 61. Accordingly, heat transferred to the deflection unit 6 can be released to the holding member 62.

The heat insulating member 63 isolates the permanent magnet 61 from the holding member 62. Accordingly, the transfer of heat from the holding member 62 to the permanent magnet 61 can be suppressed.

The deflection unit 6 includes a portion overlapping the path P when viewed in the direction perpendicular to the path P along which the electron beam B emitted from the electron gun 3 travels to the target 4. Accordingly, the electron beam B can be satisfactorily deflected by the deflection unit 6.

The heat radiating unit 7 is provided which has a higher thermal conductivity than the thermal conductivity of the permanent magnet 61 and which is thermally connected to the deflection unit 6. Accordingly, heat transferred to the deflection unit 6 can be released to the heat radiating unit 7.

The heat sink 70 includes the plurality of fins 72*a*. Accordingly, heat radiation by the heat sink 70 can be improved.

The target 4 includes the electron-incident surface 4*a* and the X-ray-emitting surface 4*b*, transmits the X-ray XR generated when the electron beam B is incident on the electron-incident surface 4*a*, and emits the X-ray XR from the X-ray-emitting surface 4*b*. In such a transmission type configuration, the target 4 is more easily disposed close to the X-ray-emitting window 5 and the focus to object distance (FOD) (distance from the X-ray focal point F to the inspection object) can be more reduced than in a reflection type configuration in which an electron-incident surface also serves as an X-ray-emitting surface. When the FOD is small, observation at a high magnification ratio can be performed. Alternatively, when it is assumed that the magnification ratio remains equal, an X-ray imaging element can be disposed close to an X-ray source, so that a bright image can be acquired.

The X-ray generation device 100 (X-ray module) includes the housing 2; the electron gun 3 that emits the electron beam B inside the housing 2; the target 4 that is disposed inside the housing 2, is fixed to the housing 2, and generates the X-ray XR when the electron beam B is incident on the target 4; the permanent magnet 61 that is disposed outside the housing 2 and deflects the electron beam B by means of a magnetic force; and the heat radiating unit 7 that has a higher thermal conductivity than the thermal conductivity of the permanent magnet 61 and is thermally connected to the permanent magnet 61. In such a manner, the X-ray generation device 100 is provided with the heat radiating unit 7 that has a higher thermal conductivity than the thermal conductivity of the permanent magnet 61 and that is thermally connected to the permanent magnet 61. Accordingly, even when heat generated in the target 4 is transferred to the permanent magnet 61, the transferred heat can be released to the heat radiating unit 7, and as a result, the heating of the permanent magnet 61 by the heat generated in the target 4 can be suppressed. Therefore, the X-ray generation device 100 is capable of stably outputting the X-ray XR.

The permanent magnet 61 includes a portion overlapping the path P when viewed in the direction perpendicular to the path P along which the electron beam B emitted from the electron gun 3 travels to the target 4. Accordingly, the electron beam B can be satisfactorily deflected by the permanent magnet 61.

The thermal conductivity of the holding member 62 holding the permanent magnet 61 is higher than the thermal conductivity of the permanent magnet 61. Accordingly, heat transferred to the permanent magnet 61 can be released to the holding member 62 as a part of the heat radiating unit 7, and can be released to the heat radiating unit 7 via the holding member 62.

The heat radiating unit 7 is thermally connected to the holding member 62. Accordingly, heat transferred to the permanent magnet 61 can be effectively released to the heat radiating unit 7 via the holding member 62.

The heat insulating member 63 is disposed at least between the permanent magnet 61 and the housing 2, and the thermal conductivity of the heat insulating member 63 is lower than the thermal conductivity of the permanent magnet 61. Accordingly, heat transferred to the housing 2 can be prevented from being transferred to the permanent magnet 61.

The heat insulating member 63 houses the permanent magnet 61 inside. Accordingly, heat transferred to the housing 2 can be effectively prevented from being transferred to the permanent magnet 61.

Modification Examples

Figure 8:
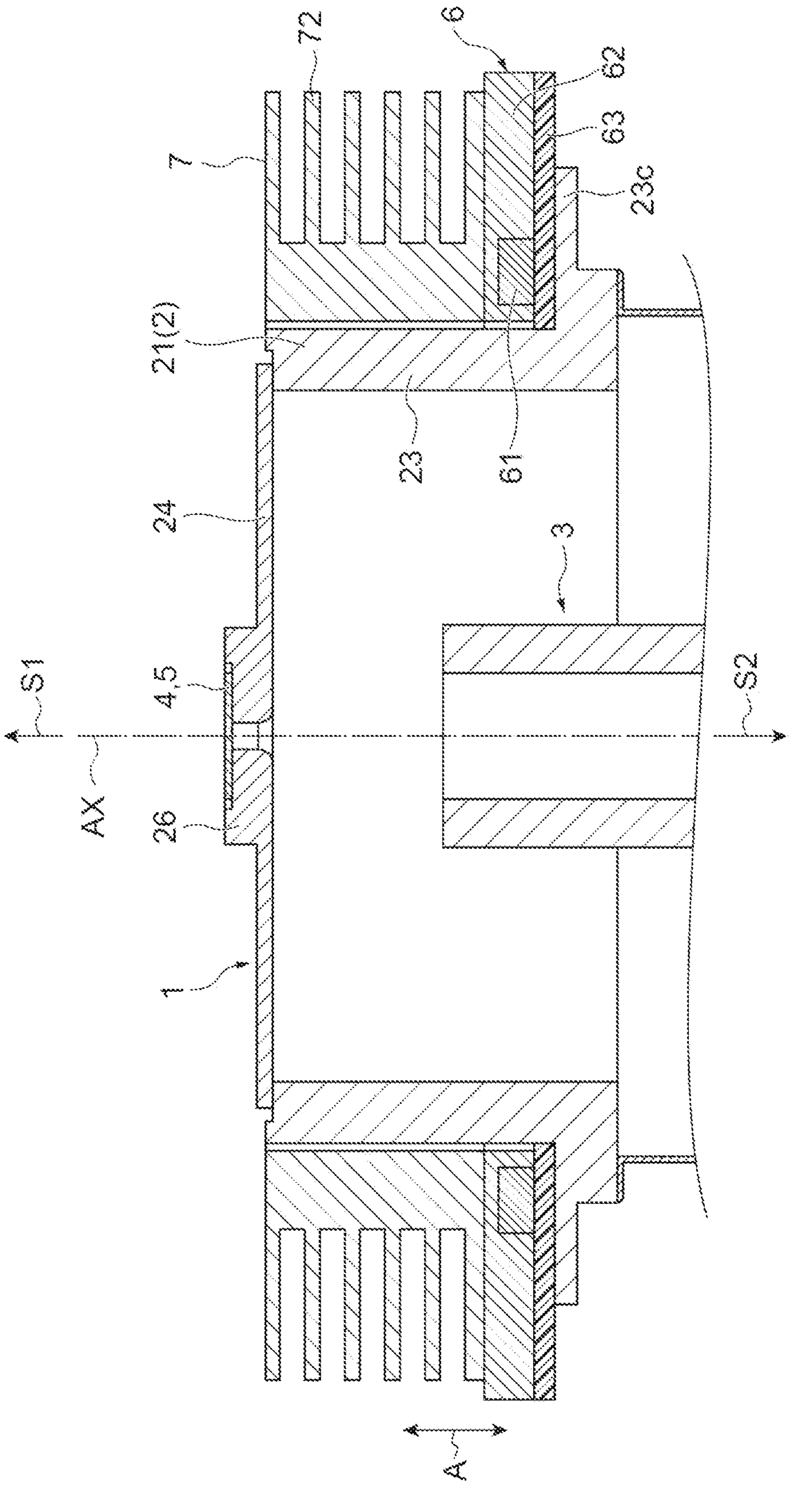
FIG. 8 is a cross-sectional view of an X-ray generation device according to a first modification example.

In a first modification example illustrated in FIG. 8, the heat insulating member 63 is formed in an annular plate shape concentric with the holding member 62. The heat insulating member 63 extends in a plate shape to partition between the permanent magnet 61 and the attachment flange 23*c* of the body portion 23, and isolates the permanent magnet 61 and the holding member 62 from the attachment flange 23*c*. The heat sink 70 includes only the second portion 72 without including the first portion 71, and is not in contact with the housing 2, but may be in contact with the housing 2. In addition, the heat insulating member 63 may extend to partition between the permanent magnet 61 and the attachment flange 23*c* of the body portion 23, and is not limited to a plate-shaped member. The heat insulating member 63 may be formed, for example, by applying and then solidifying a liquid material.

Also in the first modification example, similarly to the above embodiment, the X-ray XR can be stably output. In addition, since the heat insulating member 63 extends in a plate shape to partition between the permanent magnet 61 and the housing 2, heat transferred to the housing 2 can be effectively prevented from being transferred to the permanent magnet 61.

Figure 9:
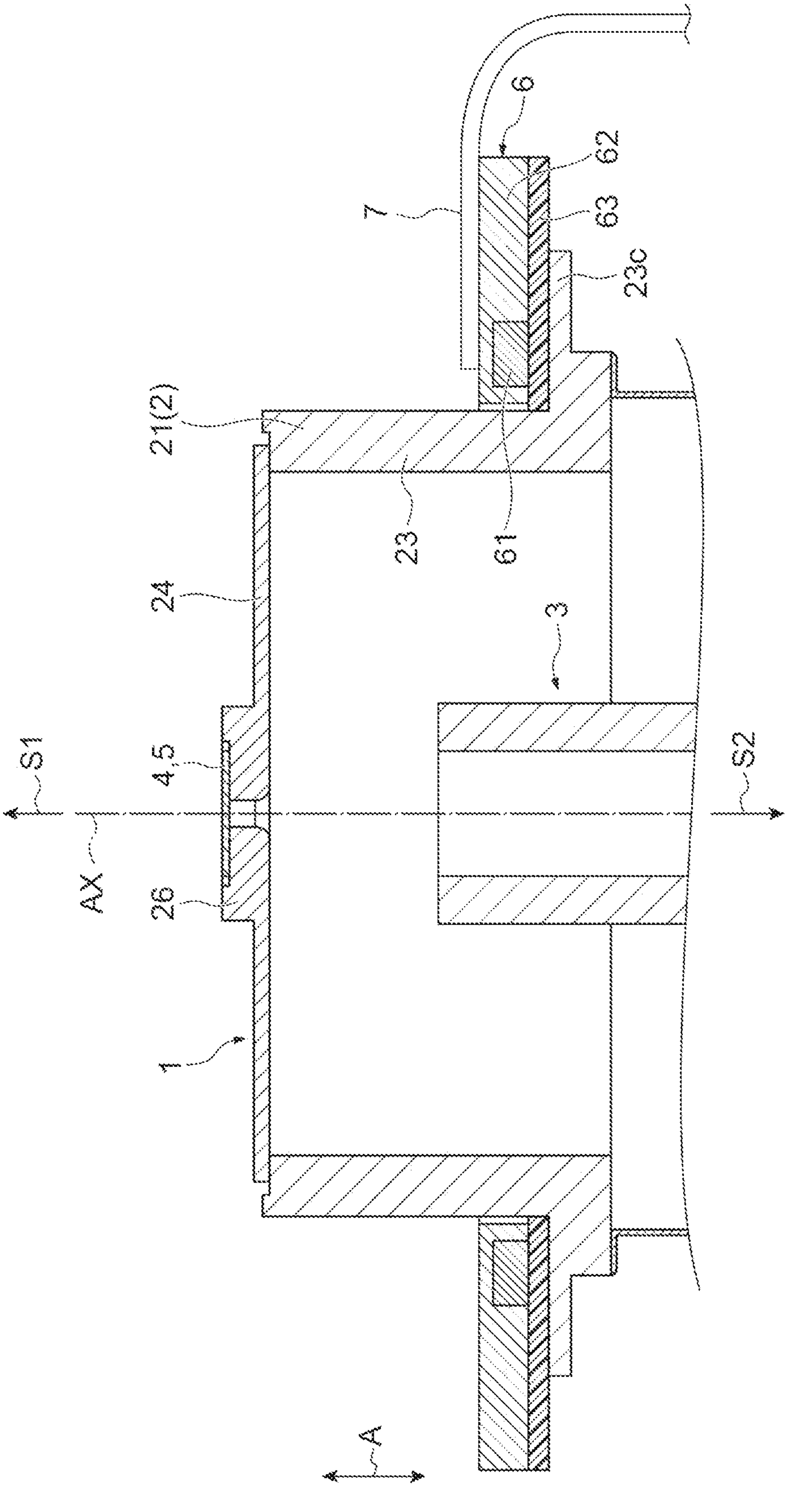
FIG. 9 is a cross-sectional view of an X-ray generation device according to a second modification example.

In a second modification example illustrated in FIG. 9, the heat radiating unit 7 is formed in a pipe shape. The heat radiating unit 7 is in contact with the surface of the holding member 62 of the deflection unit 6 on the first side S1, and is thermally connected to the permanent magnet 61. The heat radiating unit 7 forms a heat pipe, and a hydraulic fluid is sealed inside. Alternatively, the heat radiating unit 7 may form a cooling water pipe through which cooling water flows. The deflection unit 6 is configured similarly to that in the first modification example.

Also in the second modification example, similarly to the above embodiment, the X-ray XR can be stably output. In addition, since the heat radiating unit 7 is formed in a pipe shape, the heat radiating unit 7 can be used as a heat pipe, a cooling water pipe, or the like, and heat radiation by the heat radiating unit 7 can be improved.

The present disclosure is not limited to the above embodiment. For example, the material and the shape of each configuration are not limited to the material and the shape described above, and various materials and shapes can be adopted. The holding member 62 may be omitted. In this case, the permanent magnet 61 is held by the heat insulating member 63. The heat insulating member 63 may be omitted. The heat radiating unit 7 may be a cooling mechanism other than the above-described example. The heat radiating unit 7 and the holding member 62 may be integrally formed, or may be formed of one member. The heat radiating unit 7 may be omitted. The protrusion 26 may not be formed on the surface 24*a* of the housing 2, and an entirety of the surface 24*a* may be flat. In addition, at least a part of the deflection unit 6 or the heat radiating unit 7 may be integrated with the X-ray tube 1. In the above embodiment, the X-ray module forms the X-ray generation device 100; however, the X-ray module may not necessarily form the X-ray generation device, and may include, for example, only the X-ray tube 1 and the heat radiating unit 7 (heat sink 70).

What is claimed is:

1. An X-ray module comprising:

a housing;

an electron gun that emits an electron beam inside the housing;

a target disposed inside the housing and fixed to the housing, to generate an X-ray when the electron beam is incident on the target;

a permanent magnet that is disposed outside the housing and deflects the electron beam by means of a magnetic force without electrifying; and a heat radiating unit having a higher thermal conductivity than a thermal conductivity of the permanent magnet and thermally connected to the permanent magnet.

2. The X-ray module according to claim 1, wherein when viewed in a direction perpendicular to a path along which the electron beam emitted from the electron gun travels to the target, the permanent magnet includes a portion overlapping the path.

3. The X-ray module according to claim 1, further comprising a holding member holding the permanent magnet, wherein a thermal conductivity of the holding member is higher than the thermal conductivity of the permanent magnet.

4. The X-ray module according to claim 3, wherein the heat radiating unit is thermally connected to the holding member.

5. The X-ray module according to claim 1, further comprising a heat insulating member disposed at least between the permanent magnet and the housing, wherein a thermal conductivity of the heat insulating member is lower than the thermal conductivity of the permanent magnet.

6. The X-ray module according to claim 5, wherein the heat insulating member houses the permanent magnet inside.

7. The X-ray module according to claim 5, wherein the heat insulating member extends to partition between the permanent magnet and the housing.

8. The X-ray module according to claim 1, wherein the heat radiating unit includes a plurality of fins.

9. The X-ray module according to claim 1, wherein the heat radiating unit is formed in a pipe shape.

10. The X-ray module according to claim 1, wherein the heat radiating unit is thermally connected to the target.

* * * * *